United States Patent [19]

Booth et al.

[11] Patent Number: 4,829,174

[45] Date of Patent: May 9, 1989

[54] FLEXIBLE TUBE OPTICAL INTRUSION DETECTOR

[75] Inventors: Thomas L. Booth, Birmingham; Edgar H. Schlaps, Washington, both of Mich.

[73] Assignee: General Motors Corporation, Detroit, Mich.

[21] Appl. No.: 148,186

[22] Filed: Jan. 25, 1988

Related U.S. Application Data

[63] Continuation of Ser. No. 912,260, Sep. 29, 1986, abandoned.

[51] Int. Cl.⁴ ............................................. G01V 9/04
[52] U.S. Cl. .................................. 250/221; 250/222.1
[58] Field of Search ................. 250/221, 222.1, 226, 250/227, 231 R; 340/541, 555, 556; 350/96.28

[56] References Cited

U.S. PATENT DOCUMENTS

| | | | |
|---|---|---|---|
| 3,913,872 | 10/1975 | Weber | 350/96 R |
| 4,067,709 | 1/1978 | Stanton | 350/96 R |
| 4,414,537 | 11/1983 | Grimes | 340/365 P |
| 4,465,998 | 8/1984 | Durand | 340/557 |
| 4,542,291 | 9/1985 | Zimmerman | 250/231 R |
| 4,683,975 | 8/1987 | Booth et al. | 180/289 |

Primary Examiner—David C. Nelms
Assistant Examiner—Stephone B. Allen
Attorney, Agent, or Firm—C. R. Meland

[57] ABSTRACT

A hollow flexible vinyl or other plastic tube having a shiny inner wall is disposed along a boundary where intrusion detection is desired. A beam of infrared radiation from an LED at one end of the tube is passed through the tube by reflections from the wall to a detector at the other end. The radiation is conducted along curved paths as well as straight paths. An object intruding into the protected space with sufficient force to deform the tube wall attenuates the radiation. A detection circuit senses the attenuation and produces an intrusion signal. The detection circuit includes logic which detects a failure in the radiation source or a light leak in the tube.

2 Claims, 1 Drawing Sheet

U.S. Patent  May 9, 1989  4,829,174 ial light emitting diode although other
FLEXIBLE TUBE OPTICAL INTRUSION DETECTOR This is a continuation of application Ser. No. 912,260, filed on Sept. 29, 1986 now abandoned.

FIELD OF THE INVENTION

This invention relates to an optical intrusion detector and particularly to such a detector for detecting when an object enters a predefined space by the exertion of a predetermined degree of force.

BACKGROUND OF THE INVENTION

It is often desirable to selectively detect the intrusion of objects into a predetermined region. If the detected intrusion or attempted intrusion is indiscriminant, false alarms can be produced by inconsequential events. Thus a selective detector is desirable. One useful basis for discrimination is the degree of force required to trip the detector.

It is well known to use a limit switch to detect the movement of an object to a preset position. However, where an extended detection region or zone is desired optical detectors for detecting intrusion of an article into a light beam are often used. Typically the light beam is a straight path and not suitable for application to a curved region. Also the light beam sensors generally are not discriminating since the light beam can be blocked by a piece of paper or an insect as well as something which exerts a significant amount of force.

SUMMARY OF THE INVENTION

It is therefore an object of the invention to provide an optical detector for the presence of an object which requires a degree of force for operation.

It is a further object to provide such a detector which is adaptable to curved sensing regions.

The invention is carried out by an optical detector for sensing physical intrusion into a radiation path comprising; a radiation emitter, a radiation sensor spaced from the emitter, and a flexible tube with reflective inner walls for carrying radiation from the emitter to the collector by reflection from the walls, whereby upon deformation of the walls the radiation is attenuated to signal intrusion of the object.

BRIEF DESCRIPTION OF THE DRAWINGS

The above and other advantages of the invention will become more apparent from the following description taken in conjunction with the accompanying drawings wherein like reference numerals refer to like parts and wherein.

DESCRIPTION OF THE PREFERRED EMBODIMENT

Referring to FIGS. 1 through 4, a hollow flexible tube 10 is provided with a radiation source 12 at one end to irradiate the inside of the tube. Preferably the source 12 is an infrared light emitting diode although other sources and other wavelengths could be used. IR LED's are used because of their reliability and high output for a given electrical input. A radiation sensor 14 suitable for the chosen source 12 is at the other end of the tube 10 to detect any radiation which passes through the tube. The tube 10 is opaque and the source and sensor should be secured to the tube 10 in a manner to prevent ambient light from entering the tube.

Figure 1:
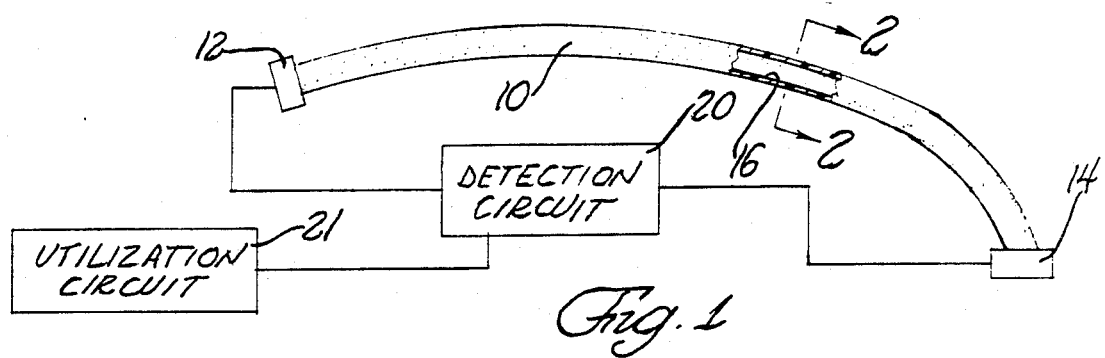
FIG. 1 is a schematic view of an optical detector according to the invention.
Figure 2:
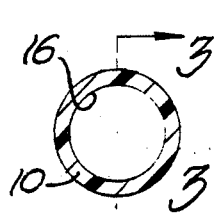
FIG. 2 is a cross-sectional view of the detector taken along lines 2—2 of FIG. 1.
Figure 3:
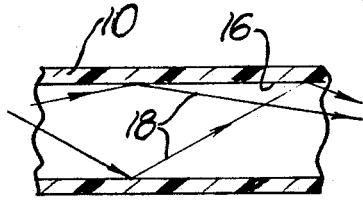
FIG. 3 is a longitudinal section of the detector taken along lines 3—3 of FIG. 2.
Figure 4:
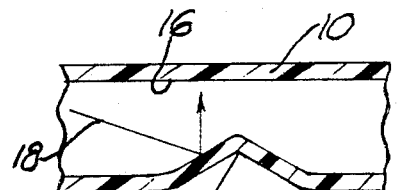
FIG. 4 is a longitudinal section of the detector illustrating its detection mode operation.

The tube 10 has a smooth, shiny inner wall 16 which reflects the radiation 18 from the source 12 as shown in FIG. 3. A tube formed of a vinyl compound such as Tygon (trademark of U.S. Stoneware Corp.) has proven to be satisfactory. Most extruded plastic tubes have smooth reflective walls adequate for this purpose. No special coating is applied to the walls but that could be done for extra efficiency in energy propagation. If there is a direct line of sight between the source 12 and the sensor 14 some radiation will be transmitted without reflection. An advantage of the flexible tube is that it can be curved to conform to a nonlinear detection space. Then the radiation will be transmitted from the source 12 to the sensor 14 by multiple reflections from the inner wall 16. Thus the mechanism of energy propagation is analogous to that in fiber optics, although the structure is inverted with the radiation traveling through the hollow of the tube rather than the solid portion. The tube 10 can be bent around curves without significant loss of radiant energy. For example, a ⅛ inch i.d. tube has been curved 90° around a one inch radius and continued to operate efficiently. As shown in FIG. 4, the flexible tube 10 is subject to deformation by an object 19 which exerts enough force to indent the tube, but will successfully resist deformation by small forces so that a threshold is determined by the resilience of the tube wall. Thus the choice of tube material and dimensions establishes the resilience and the force threshold. It is also important that the tube recover its original shape when the force is removed. For example Tygon tubing having ¼ inch i.d. and ⅜ inch o.d. has been successfully used to sense small deformation forces: a cylindrical object having a ½ inch diameter pressed against the tubing with a force of a few ounces was sufficient to signal an intrusion. When the tube is deformed the transmitted radiation is reduced by an amount depending on the degree of deformation. Thus by sensing the attenuation of received radiation the deformation of the tube can be detected.

Figure 5:
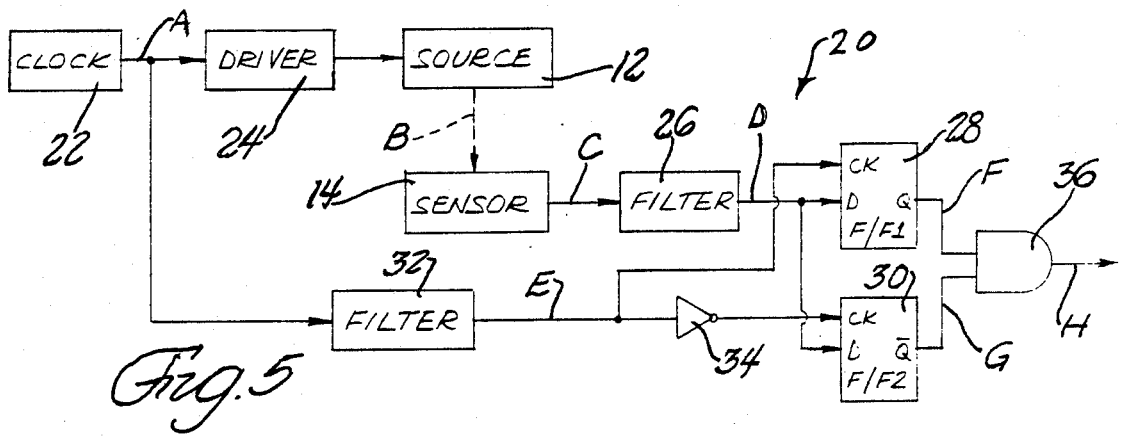
FIG. 5 is a detection circuit for the detector according to the invention.
Figure 6:
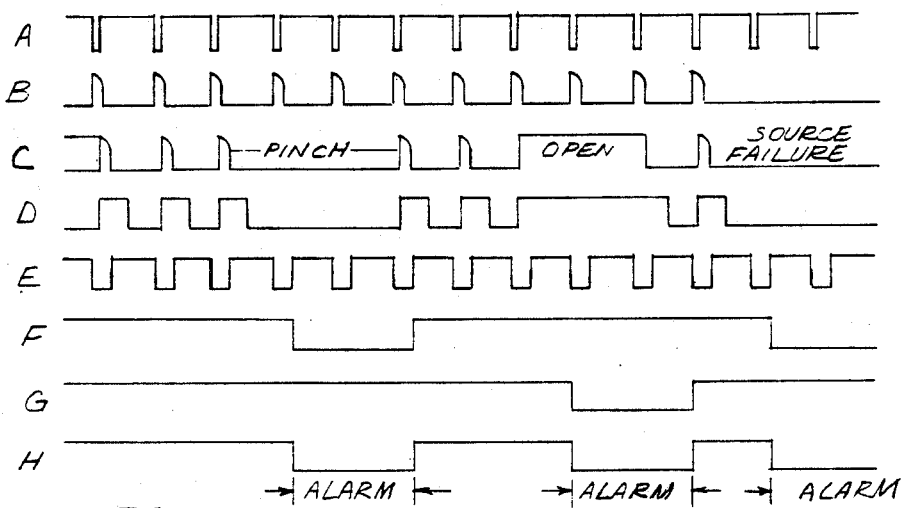
FIG. 6 is a set of digital waveforms illustrating the operation of the detection circuit.

A detection circuit 20 which includes the source 12 and the sensor 14 supplies energizing power to the source 12 and receives the electrical output signal of the sensor. Specific apparatus which has been used include a Siemens SFH 484 LED having a wavelength of 880 nm for the source 12 and a Siemens phototransistor BP 103 B-4 with a gain adjusting circuit for the sensor 14. The source 12 is driven by a 5 microsecond 1 amp pulse and the sensor 14 is adjusted to normally generate a 10 microamp output of the phototransistor. Preferably the gain is set to cut off the sensor output when the radiation level falls to about 25% of its normal value. The detection circuit 20 output is fed to a utilization circuit 21 which may, for example, comprise an intrusion alarm, indicator, or a controller for some device. FIG. 5 shows the circuit 20 which is a digital logic circuit for detecting attenuation of received radiation and also detects failure modes due, for example, to a break in the tube 10 admitting ambient radiation to the sensor 14. FIG. 6 depicts waveforms which occur in various parts of the circuit 20 as identified by reference letters A–H. The waveforms represent the light signal or electrical signals varying between zero value or ground and a positive level which may be interpreted as logic "0" and "1" values.

The detection circuit 20 includes a clock 22 which delivers pulses A to a driver 24 which energizes the source 12 to emit radiation signals B into the tube. The clock signal preferably has a frequency of 1 kHz and a duty cycle less than 1%. The driver 24 yields pulses of much larger duty cycle to produce the radiation pulses B having an initial short peak value. The pulse widths are not shown to scale in the drawing but the pulse timing is correct. The pulses B are attenuated during their travel through the tube so that only the short peak portion is detectable at the sensor 14. The sensor 14 receives the radiation pulses B and emits corresponding signals C which are slightly delayed by the sensor relative to the clock signal and have a duty cycle of about 1% duty cycle. The signals C are then stretched by a filter 26 to provide wider pulses D (10% to 50% duty cycle) that are coupled to the data inputs of two flip-flop circuits 28 and 30. The pulses of the clock signal A are also stretched by a filter 32 to produce positive pulses E which are wider than the pulses D and timed to go positive during the positive cycle of the D pulse and to go negative during the negative cycle of the D pulse. The pulses E are fed to the clock input of the flip-flop 28 and are also inverted by inverter 34 and fed to the clock input of the flip-flop 30. The respective outputs F and G of the flip-flops 28 and 30 are coupled to the inputs of an AND gate 36 which yields the output H of the detection circuit 20.

In operation of the detector circuit 20, the clock pulses A normally produce light pulses B, as shown for the first three clock pulses in FIG. 6, and sensor signals C and signals D are produced. At the flip-flop 28 the positive-going edge of the pulses E occur when the signal D is positive and the Q output F of the flip-flop 28 is positive. The inverted E signals applied to the flip-flop 30 occur just before the signals D go positive so that $\bar{Q}$ signal G is positive. The two positive signals F and G yield a positive output H from the AND gate 36 indicating the detector is operative and no intrusion is detected.

If the radiation is attenuated by pinching the tube 10, the signals C and D are not produced as shown for the 4th and 5th clock pulses in FIG. 6 and the outputs F and H of the flip-flop 28 and the gate 36 go to zero. This is the signal that an intrusion is detected. The same output signal may indicate a failure in the system. In the drawing the right ends of the lines of B and C signals show an absence of pulses as a result of source 12 failure or driver 24 failure. This affects the circuit the same way as pinching the tube and the output signal H goes to zero.

Another fault condition detected by the system is a tube opening which admits ambient light into the tube to the sensor. If the resulting sensor signal is above the sensor threshold the signals C and D remain positive, as shown in the region marked "open" in the line C of FIG. 6. Then when the inverted E signal goes positive the signal D will also be positive and the flip-flop 30 will produce a zero value G signal which causes a zero value output H.

It will thus be seen that the system according to this invention provides an optical detector which is useful to monitor either a straight or curved region against intrusion and that the detected intrusion is limited to events which are sufficiently forceful to pinch the tube. In addition the system is self monitoring to issue a signal upon failure of key components of the system.

The embodiments of the invention in which an exclusive property or privilege is claimed are defined as follows:

1. An optical detector for sensing physical intrusion of an object into a curved path comprising, a curved flexible hollow tube positioned in the curved path, the tube having reflective inner walls for transmitting radiation by reflection from one end of the tube to the other, the tube being subject to indentation by an intruding object, a radiation emitter and a radiation sensor at opposite ends of the tube so that the tube transmits radiation by internal reflection from the emitter to the sensor to yield a sensor signal, a drive circuit for periodically energizing said emitter to produce a series of spaced radiation pulses, said radiation pulses being applied to said sensor by means of said tube when radiation pulses are produced, and a logic circuit coupled to said drive circuit and to the sensor output for producing a signal when radiation pulses are produced and the tube is indented by said object to attenuate the transmission of radiation pulses between the emitter and sensor, said logic circuit including means for producing said signal when ambient light is admitted into the interior of said tube and causes said sensor to produce an output.

2. The optical detector according to claim 1 where the logic circuit includes means for producing said signal when no radiation pulses are produced.

* * * * *